United States Patent
Dunn

(10) Patent No.: US 7,958,296 B2
(45) Date of Patent: *Jun. 7, 2011

(54) SYSTEM MANAGEMENT AND ADVANCED PROGRAMMABLE INTERRUPT CONTROLLER

(76) Inventor: David A. Dunn, Sammamish, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/574,599

(22) Filed: Oct. 6, 2009

(65) Prior Publication Data

US 2010/0257297 A1    Oct. 7, 2010

Related U.S. Application Data

(63) Continuation of application No. 11/644,224, filed on Dec. 22, 2006, now Pat. No. 7,610,426.

(51) Int. Cl.
*G06F 13/24* (2006.01)
(52) U.S. Cl. ............. 710/267; 710/268; 710/262; 711/2
(58) Field of Classification Search .......... 710/260–269; 713/164–165, 187–188, 193–194; 711/2
See application file for complete search history.

(56) References Cited

U.S. PATENT DOCUMENTS

| | | | |
|---|---|---|---|
| 5,627,962 A | 5/1997 | Goodrum et al. | |
| 5,638,532 A | 6/1997 | Frame et al. | |
| 5,682,509 A | 10/1997 | Kabenjian | |
| 5,805,880 A | 9/1998 | Pearce et al. | |
| 5,809,314 A | 9/1998 | Carmean et al. | |
| 5,857,116 A | 1/1999 | Ayash et al. | |
| 5,867,642 A | 2/1999 | Vivio et al. | |
| 5,909,696 A | 6/1999 | Reinhardt et al. | |
| 6,125,450 A | 9/2000 | Kardach | |
| 6,192,455 B1 | 2/2001 | Bogin et al. | |
| 6,339,808 B1 | 1/2002 | Hewitt et al. | |
| 6,453,278 B1 | 9/2002 | Favor et al. | |
| 6,658,515 B1 | 12/2003 | Larson et al. | |
| 6,694,401 B2 | 2/2004 | Nalawadi et al. | |
| 6,775,728 B2 | 8/2004 | Zimmer et al. | |
| 6,871,328 B1 | 3/2005 | Fung et al. | |
| 7,149,854 B2 | 12/2006 | Weber et al. | |
| 7,216,189 B2 | 5/2007 | Berlin | |
| 7,418,584 B1 | 8/2008 | Klaiber et al. | |
| 7,426,657 B2 | 9/2008 | Zorek, Sr. et al. | |
| 7,496,966 B1 | 2/2009 | McGrath et al. | |
| 7,610,426 B1 * | 10/2009 | Dunn | 710/267 |
| 2003/0028781 A1 | 2/2003 | Strongin | |
| 2003/0126349 A1 | 7/2003 | Nalawadi et al. | |
| 2004/0123090 A1 | 6/2004 | Zimmer et al. | |
| 2005/0097384 A1 | 5/2005 | Uehara et al. | |
| 2005/0182879 A1 | 8/2005 | Vu | |
| 2007/0186023 A1 | 8/2007 | Ho | |
| 2008/0114916 A1 | 5/2008 | Hummel et al. | |

OTHER PUBLICATIONS

"MultiProcessor Specification", Version 1.4, May 1997, Intel Corporation, p. 3-12.
Duflot et al., "Using CPU System Management Mode to Circumvent Operating System Security Functions", Apr. 20, 2006, LRI, http://www.ssi.gouv.fr/fr/sciences/fichiers/lti/cansecwest2006-duflot-paper.pdf.
Final Office Action, Mail Date Jun. 15, 2009; U.S. Appl. No. 11/479,703.

(Continued)

*Primary Examiner* — Raymond N Phan

(57) ABSTRACT

Methods for processing more securely are disclosed. Embodiments provide effective and efficient mechanisms for reducing APIC interference with accesses to SMRAM, where enhanced SMM code implementing these mechanisms effectively reduces APIC attacks and increases the security of proprietary, confidential or otherwise secure data stored in SMRAM.

23 Claims, 14 Drawing Sheets

OTHER PUBLICATIONS

Final Office Action, Mail Date Oct. 10, 2008; U.S. Appl. No. 11/479,703.
Non Final Office Action, Mail Date Feb. 13, 2009; U.S. Appl. No. 11/479,703.
Non Final Office Action, Mail Date May 21, 2008; U.S. Appl. No. 11/479,703.
Restriction Requirement, Mail Date Mar. 5, 2008; U.S. Appl. No. 11/479,703.
Non Final Office Action, Mail Date Jul. 21, 2009; U.S. Appl. No. 11/479,486.
Non Final Office Action, Mail Date Sep. 29, 2008; U.S. Appl. No. 11/644,224.
Notice of Allowance, Mail Date Feb. 27, 2009; U.S. Appl. No. 11/644,224.
Notice of Allowance, Mail Date Jun. 22, 2009; U.S. Appl. No. 11/644,224.

* cited by examiner

SYSTEM MANAGEMENT AND ADVANCED PROGRAMMABLE INTERRUPT CONTROLLER

RELATED APPLICATIONS

The present application is a continuation of U.S. patent application Ser. No. 11/644,224, filed Dec. 22, 2006, entitled "SYSTEM MANAGEMENT MODE CODE MODIFICATIONS TO INCREASE COMPUTER SYSTEM SECURITY," naming David A. Dunn as the inventor, assigned to the assignee of the present invention. That application is incorporated herein by reference in its entirety and for all purposes.

The present application is related to U.S. patent application Ser. No. 11/479,703, filed Jun. 29, 2006, entitled "PROCESSOR AND NORTHBRIDGE MODIFICATIONS TO INCREASE COMPUTER SYSTEM SECURITY," naming David A. Dunn as the inventor, assigned to the assignee of the present invention. That application is incorporated herein by reference in its entirety and for all purposes.

The present application is related to U.S. patent application Ser. No. 11/479,486, filed Jun. 29, 2006, entitled "PROCESSOR MODIFICATIONS TO INCREASE COMPUTER SYSTEM SECURITY," naming David A. Dunn as the inventor, assigned to the assignee of the present invention. That application is incorporated herein by reference in its entirety and for all purposes.

BACKGROUND OF THE INVENTION

Most all modern central processing units, namely those based on the x86 architecture, employ system management random access memory (SMRAM) to carry out trusted system management mode (SMM) operations. While in SMM, the processor is able to execute code and access data stored in SMRAM. This code executed while the processor is in SMM is typically referred to as SMM code. All other processor and device accesses to SMRAM are prevented, making the contents of SMRAM inaccessible to the operating system or devices. As such, in reliance upon the privileged nature of SMM, developers continue to place increasing amounts of secure data within SMRAM.

In addition to SMRAM, most modern CPUs also utilize a local advanced programmable interrupt controller (APIC) for managing CPU interrupts. Most APICs are implemented within the CPU and mapped to physical memory, where the APIC mapping may be moved within physical memory by altering a base address (e.g., "APICBASE") within the APICBASE model specific register of the CPU. As such, an unauthorized user may utilize the APIC to attack a computer system running in SMM by moving the APIC mapping over SMRAM, thereby derailing SMRAM requests and forcing trusted SMM code to read different values than it previously wrote. Additionally, unauthorized users may place the APIC mapping over code stacks within physical memory to jump out of SMRAM upon return from SMM subroutines, thereby enabling the mounting of larger attacks.

SUMMARY OF THE INVENTION

Accordingly, a need exists to improve the security of processors utilizing SMRAM and an APIC. Additionally, a need exists to reduce the ability of the APIC to compromise the security of SMRAM and SMM operation. Furthermore, a need exists to utilize enhanced SMM code to reduce APIC interference with accesses to SMRAM.

Embodiments of the present invention are directed to methods for processing more securely. More specifically, embodiments provide effective and efficient mechanisms for reducing APIC interference with accesses to SMRAM, where enhanced SMM code implementing these mechanisms effectively reduces APIC attacks and increases the security of proprietary, confidential or otherwise secure data stored in SMRAM.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
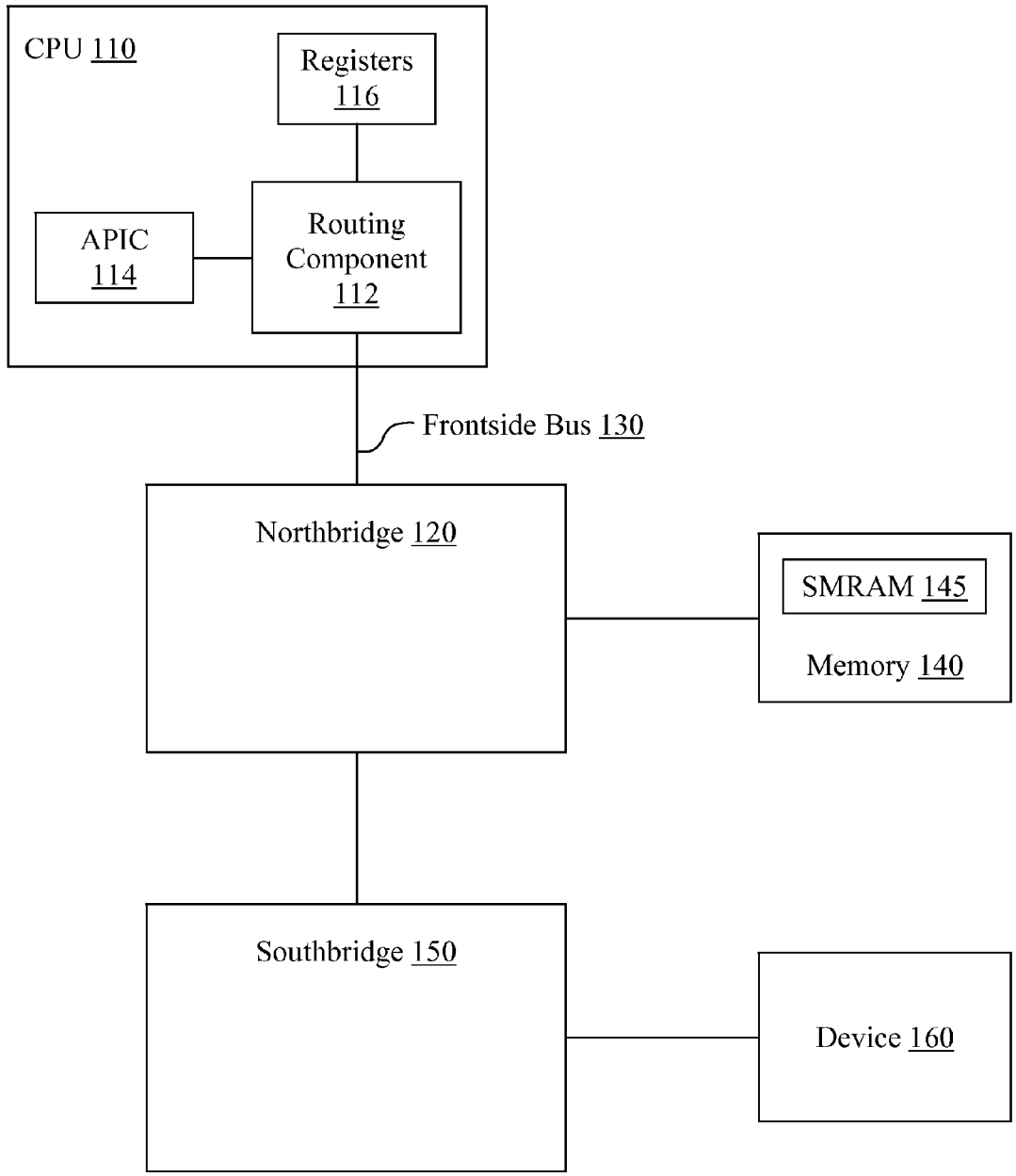
FIG. 1 shows a block diagram of an exemplary computer system for processing more securely in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "writing," "identifying," "defining," "determining," "performing," "processing," "comparing," "repeating," "creating," "modifying," "moving," "establishing," "using," "calculating," "accessing," "generating," "limiting," "copying," "utilizing," "reducing," "tracking," "routing," "updating," "snooping," "preventing," "storing," "enabling," "disabling," "allowing," "denying," "handling," "transferring," "detecting," "returning," "changing," "mapping," "executing," "halting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform & SMM

FIG. 1 shows a block diagram of exemplary computer system 100 for processing more securely in accordance with one embodiment of the present invention. As shown in FIG. 1, x86-compliant central processing unit (CPU) 110 is coupled to northbridge 120 via frontside bus 130. Northbridge 120 enables CPU 110 to communicate with memory 140, where memory 140 comprises system management random access memory (SMRAM) 145. Southbridge 150 is coupled to northbridge 120, thereby enabling CPU 110 to communicate with device 160.

As depicted in FIG. 1, CPU 110 comprises routing component 112 coupled to local advanced programmable interrupt controller (APIC) 114. Registers 116 coupled to routing component 112 to allow system management mode (SMM) code to track the location and/or size of SMRAM. Additionally, registers 116 may track the location and/or size of a memory mapping of an APIC of CPU 110 (e.g., 114). As such, SMM code run on CPU 110 may effectively reduce APIC attacks and increase the security of proprietary, confidential or otherwise secure data stored in SMRAM 145.

Although computer system 100 is depicted in FIG. 1 as having only a single processor, is should be appreciated that computer system 100 may comprise two or more processors. Additionally, although CPU 110 is depicted in FIG. 1 as having only one routing component (e.g., 112), it should be appreciated that CPU 110 may have two or more routing components in other embodiments, where the multiple routing components may be implemented with one or more APICs corresponding to one or more of the routing components. Similarly, computer system 100 may utilize additional memory components, which may comprise SMRAM. As such, SMRAM may be spread amongst more than one memory module in other embodiments.

SMM code may track the location of SMRAM 145 using registers 116, which is important to reducing APIC interference with accesses to SMRAM. Registers 116 may contain any form of data enabling the SMM code to determine and/or approximate the location of SMRAM. For example, registers 116 may contain an address indicating the top of SMRAM (e.g., TOM) and/or an address indicating the bottom of SMRAM (e.g., TOM minus TSEG). Alternatively, one or more intermediate addresses indicating the location of SMRAM may be stored within registers 116. Moreover, it should be appreciated that alternate means may be used to locate SMRAM (e.g., by storing an extent of SMRAM on one or both sides of a given address within physical memory, etc.).

Although registers 116 are depicted in FIG. 1 as a single register, it should be appreciated that registers 116 may contain one or more registers. Registers 116 may be model specific registers (MSRs) or non-MSRs, or a combination of the two. Additionally, although registers 116 are depicted as a separate component from routing component 112, they may also be integrated within routing component 112. Moreover, it should be appreciated that the location and/or size of SMRAM may be stored within a single register, or rather each within a separate register. Further, the location and/or size of SMRAM may span more than one register.

Figure 2:
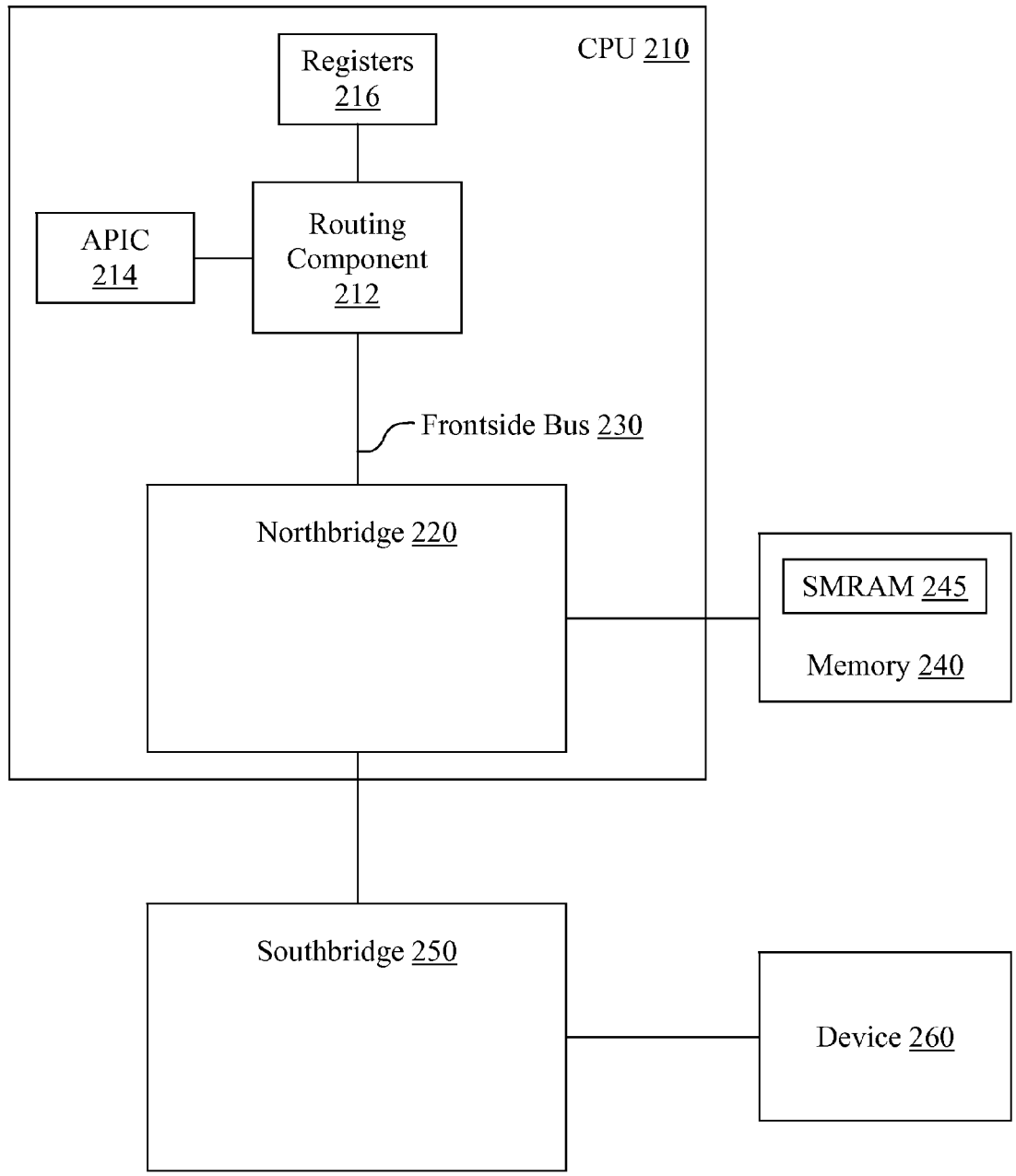
FIG. 2 shows a block diagram of an exemplary computer system with a processor-integrated northbridge for processing more securely in accordance with one embodiment of the present invention.

FIG. 2 shows a block diagram of exemplary computer system 200 with a processor-integrated northbridge for processing more securely in accordance with one embodiment of the present invention. As shown in FIG. 2, computer system 200 is similar to computer system 100, except for the incorporation of northbridge 220 and frontside bus 230 into x86-compliant CPU 210. As such, CPU 210 comprises routing component 212 coupled to APIC 214. Registers 216 coupled to routing component 212 allow SMM code to track the location and/or size of SMRAM. Additionally, registers 216 may track the location and/or size of a memory mapping of an APIC of CPU 210 (e.g., 214). As such, SMM code run on CPU 210 may effectively reduce APIC attacks and increase the security of proprietary, confidential or otherwise secure data stored in SMRAM 245 similar to computer system 100 as discussed above with respect to FIG. 1.

Given that northbridge 220 is incorporated within CPU 210, memory 240 and southbridge 250 are shown coupled to CPU 210. As such, CPU 210 is able to communicate with memory 240 and device 260 utilizing northbridge 220 and southbridge 250, respectively.

Figure 3:
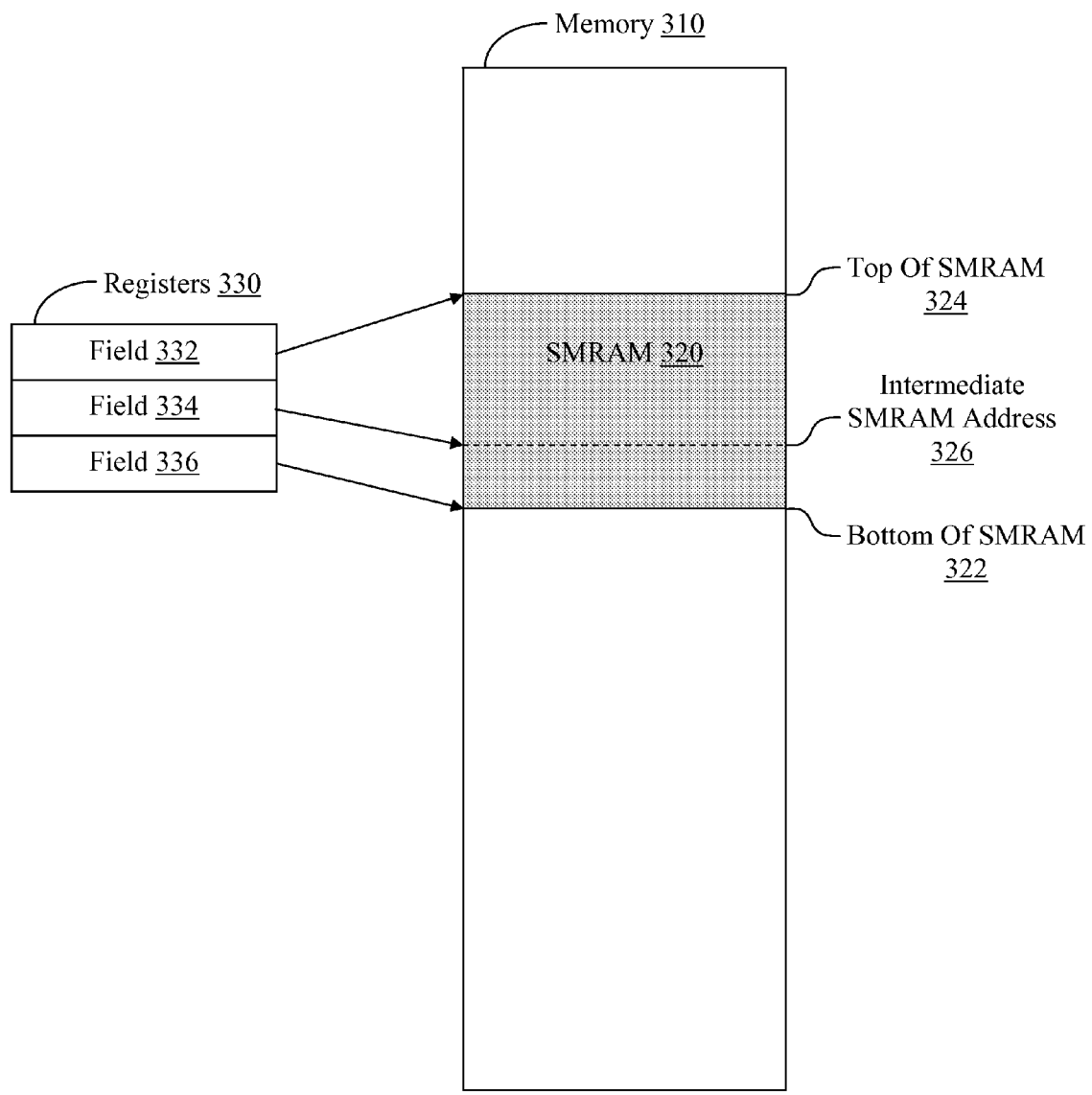
FIG. 3 shows a block diagram depicting SMRAM in memory in accordance with one embodiment of the present invention.

FIG. 3 shows block diagram 300 depicting SMRAM 320 in memory 310 in accordance with one embodiment of the present invention. As shown in FIG. 3, memory 310 may be physical memory (e.g., 140 and/or 240) accessible by SMM code running on a processor (e.g., 110 and/or 210) of a computer system (e.g., 100 and/or 200). Accordingly, a portion of memory 310 may be designated as SMRAM (e.g., 145 and/or 245). For example, SMRAM 320 occupies a portion of memory 310 between addresses bottom of SMRAM 322 and top of SMRAM 324.

To effectively reduce APIC attacks by reducing APIC interference with accesses to SMRAM, SMM code may track the location and/or size of SMRAM. As shown in FIG. 3, registers 330 may be used by SMM code to track the location of SMRAM 320 within memory 310, where the registers comprise a number of fields. Specifically, field 332 contains information (e.g., a pointer) to top of SMRAM 234, and field 336 contains information about bottom of SMRAM 322. As such, the SMM code may then determine that SMRAM 320 lies in memory 310 between the addresses bottom of SMRAM 322 and top of SMRAM 324.

Alternatively, SMM code may estimate the location and/or size of SMRAM 320 by using one or more known addresses (e.g., stored in registers 330) and information about the extent of SMRAM on either side of the known address or addresses. For example, if the SMM code knows that SMRAM is roughly 64 kilobytes in length and can access field 336 of registers 330 to determine or estimate bottom of SMRAM 322, it can determine top of SMRAM by adding 64 kilobytes to bottom of SMRAM 322. Additionally, the SMM code may access field 334 of registers 330 to determine intermediate SMRAM address 326. Provided the SMM code can estimate the extent of SMRAM on either side of intermediate SMRAM address 326 (e.g., 44 kilobytes above and 20 kilobytes below), it can determine or approximate the location and/or size of SMRAM.

Registers 330 may comprise one or more registers (e.g., 116 and/or 126) within a processor (e.g. 110 and/or 210) for tracking the size and/or location of SMRAM. As such, registers 330 may be MSRs or non-MSRs. Additionally, although fields 332, 334 and 336 are shown as contiguous fields, it should be appreciated that the fields may be non-contiguous fields with the same or different registers. And although fields 332, 334 and 336 all point to locations representing a contiguous SMRAM block within the same memory (e.g., 310), it should be appreciated that SMRAM may be spread over multiple locations of one or more memories. As such, the fields of registers 330 may point to one or more locations within the same memory, or instead to locations within two or more memories.

Figure 4:
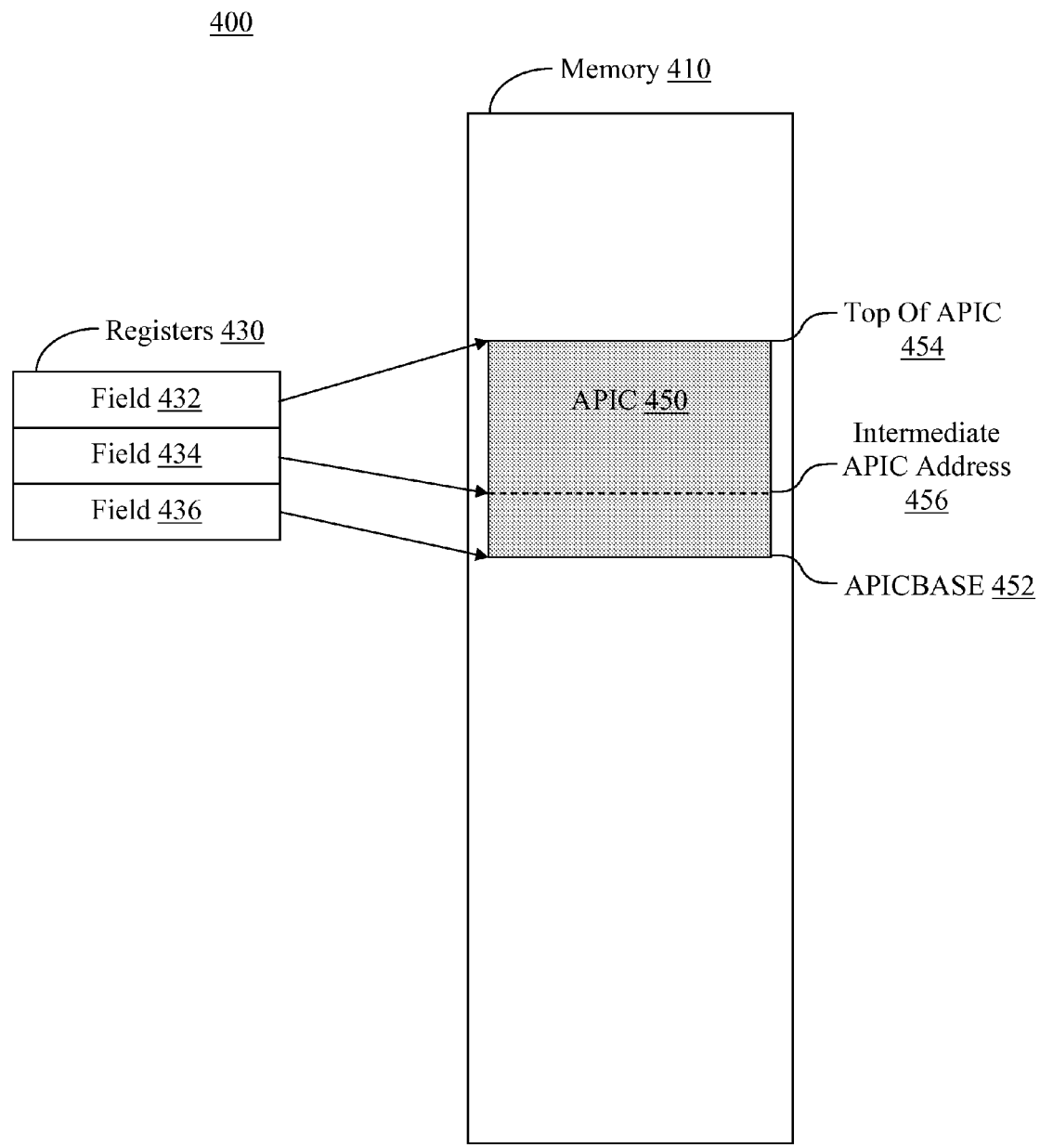
FIG. 4 shows a block diagram depicting a memory mapping of an APIC in accordance with one embodiment of the present invention.

FIG. 4 shows block diagram 400 depicting a memory mapping of APIC 450 in accordance with one embodiment of the present invention. As shown in FIG. 4, memory 410 may be physical memory (e.g., 140 and/or 240) accessible by SMM code running on a processor (e.g., 110 and/or 210) of a computer system (e.g., 100 and/or 200). Accordingly, a portion of memory 410 may be used for the mapping an APIC (e.g., 114). For example, APIC 450 is mapped to a portion of memory 410 between addresses APICBASE 452 and top of APIC 454.

To effectively reduce APIC attacks by reducing APIC interference with accesses to SMRAM, SMM code may track the location and/or size of APICs. As shown in FIG. 4, registers 430 may be used by SMM code to track the location of APIC 450 within memory 410, where the registers comprise a number of fields. Specifically, field 432 contains information (e.g., a pointer) to top of APIC 454, and field 436 contains information about APICBASE 452. As such, the SMM code may then determine that APIC 450 is mapped to memory 410 between the addresses APICBASE 452 and top of APIC 454.

Alternatively, SMM code may estimate the location and/or size of the mapping of APIC 450 by using one or more known addresses (e.g., stored in registers 430) and information about the extent of the APIC mapping on either side of the known address or addresses. For example, if the SMM code knows that the APIC mapping is roughly 4 kilobytes in length and can access field 436 of registers 430 to determine or estimate APICBASE 452, it can determine top of APIC by adding 4 kilobytes to APICBASE 452. Additionally, the SMM code may access field 434 of registers 430 to determine intermediate APIC address 456. Provided the SMM code can estimate the extent of the APIC mapping on either side of intermediate APIC address 456 (e.g., 2500 bytes above and 1500 bytes below), it can determine or approximate the location and/or size of the APIC mapping.

Registers 430 may comprise one or more registers (e.g., 116 and/or 126) within a processor (e.g. 110 and/or 210) for tracking the size and/or location of an APIC mapping. As such, registers 430 may be MSRs or non-MSRs. Additionally, although fields 432, 434 and 436 are shown as contiguous fields, it should be appreciated that the fields may be non-contiguous fields with the same or different registers. And although fields 432, 434 and 436 all point to locations representing a contiguously-mapped APIC block within the same memory (e.g., 410), it should be appreciated that the APIC mapping may be spread over multiple locations of one or more memories. As such, the fields of registers 430 may point to one or more locations within the same memory, or instead to locations within two or more memories.

Figure 5:
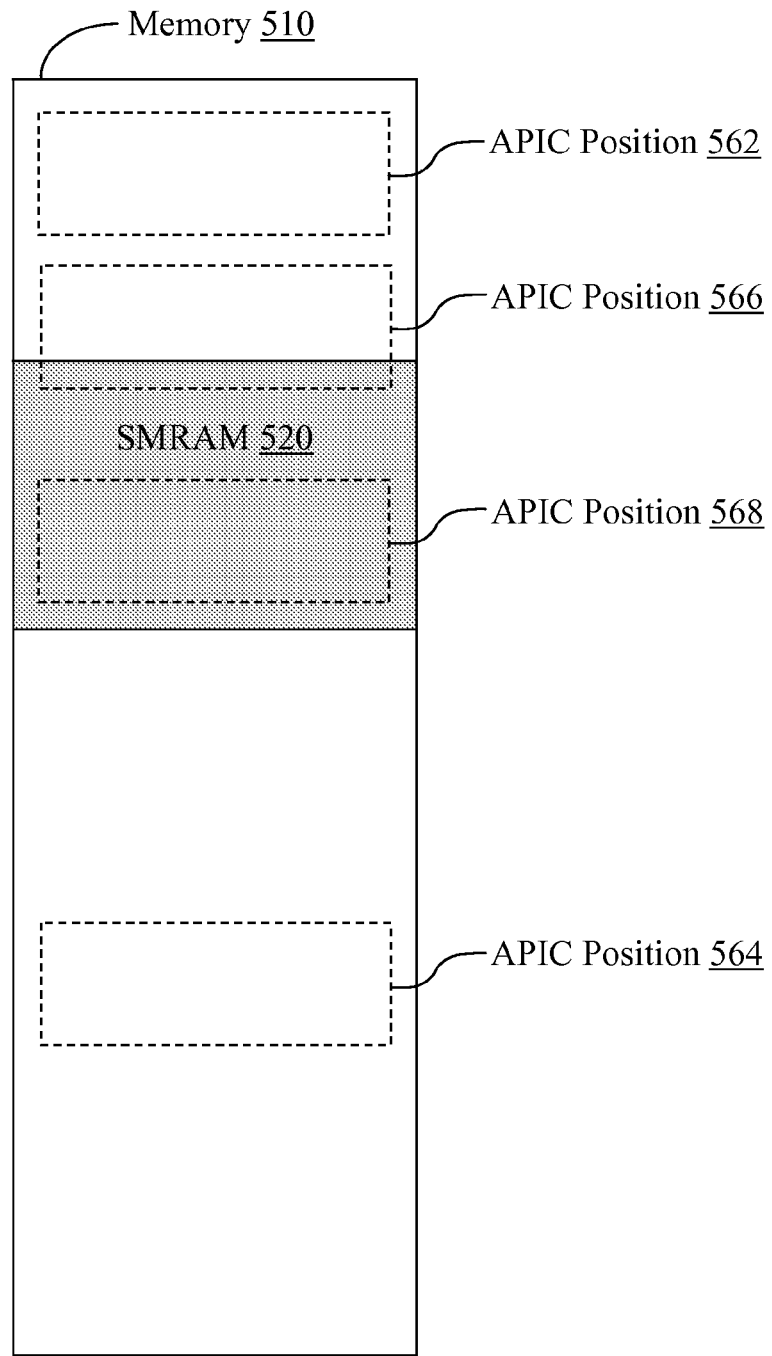
FIG. 5 shows a block diagram depicting various locations of an APIC memory mapping in accordance with one embodiment of the present invention.

FIG. 5 shows block diagram 500 depicting various locations of an APIC memory mapping in accordance with one embodiment of the present invention. As shown in FIG. 5, memory 510 may be physical memory (e.g., 140 and/or 240) accessible by a processor (e.g., 110 and/or 210) of a computer system (e.g., 100 and/or 200). Accordingly, a portion of memory 510 may be designated as SMRAM (e.g., 145 and/or 245) as discussed above with respect to FIG. 3.

Referring back to FIG. 4, APIC 450 represented a memory mapping of a local APIC of a processor, whose position within memory 410 may be defined by top of APIC 454, intermediate APIC address 456 and/or APICBASE 452. Accordingly, the location of APIC 450 may be adjusted within memory 410 by altering one of the address values within registers 430.

Turning again to FIG. 5, four different APIC mapping positions are shown, which may be determined by adjusting register values indicating addresses within physical memory to which an APIC is mapped. For example, APIC position 562 represents an APIC mapped above SMRAM 520 with no overlap, while APIC position 564 represents an APIC mapped below SMRAM with no overlap. While APIC positions 562 and 564 do not overlap SMRAM 520, the APIC may be mapped over SMRAM in other embodiments. For example, APIC position 566 represents an APIC mapped with some overlap of SMRAM 520, and APIC position 568 represents an APIC mapped within SMRAM 520.

As discussed above with respect to FIGS. 1 and 2, embodiments of the present invention improve the security of processing by reducing interference of the APIC with accesses to SMRAM. Since the APIC is mapped to physical memory and can overlap SMRAM (e.g., APIC positions 566 and 568), the APIC presents a security threat if allowed to intercept or otherwise interfere with accesses to SMRAM as SMM code is then forced to read values other than those that were previously written. However, embodiments neutralize such attacks by reducing and/or preventing APIC interference with accesses to SMRAM, which effectively allows trusted memory accesses to "see through" an overlapping and malicious APIC mapping.

SMM Code Relocation of APIC Mapping

Figure 6:
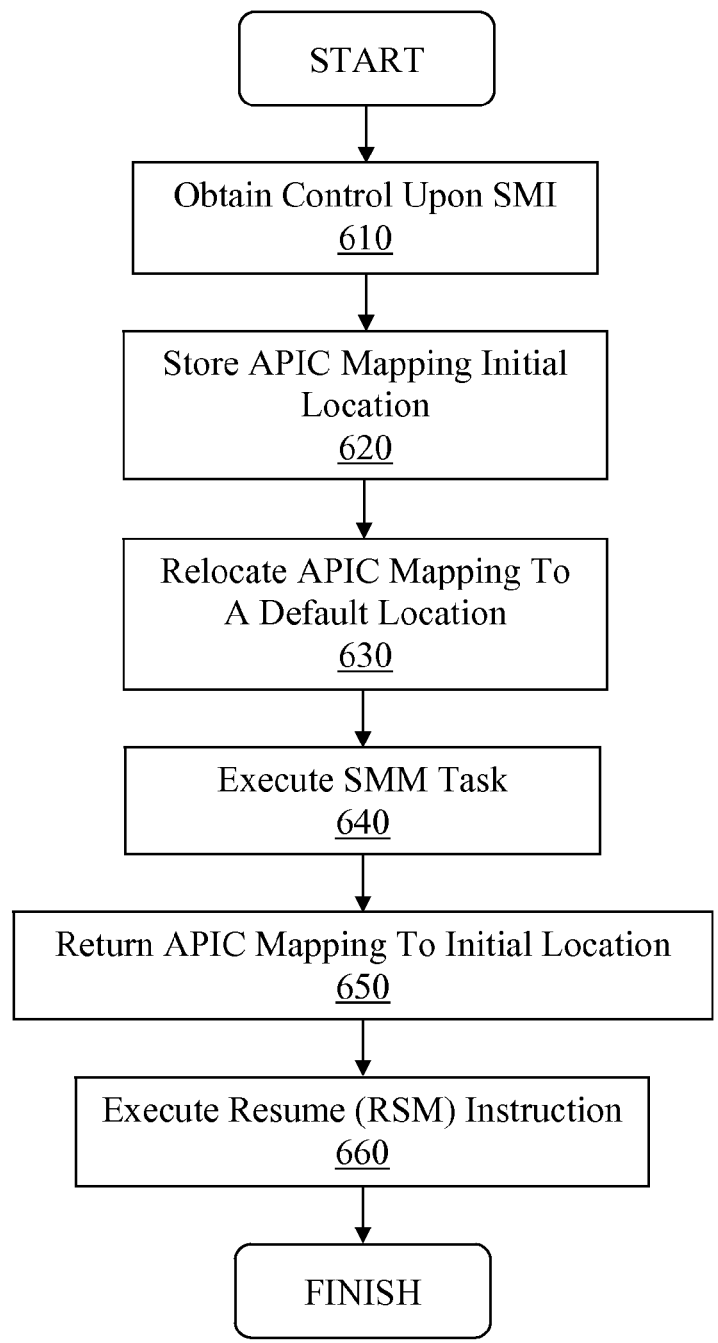
FIG. 6 shows a computer-implemented process for relocation of an APIC mapping to a default location by SMM code to improve the security of processing in accordance with one embodiment of the present invention.

FIG. 6 shows computer-implemented process 600 for relocation of an APIC mapping to a default location by SMM code to improve the security of processing in accordance with one embodiment of the present invention. As shown in FIG. 6, step 610 involves SMM code obtaining control upon SMI. Control may be transferred from the processor (e.g., 110, 210, etc.), and/or software code running thereon, to SMM code upon the execution of an SMI. Thereafter, SMM code may execute tasks, operations and/or other processes in the more-secure SMM environment.

After SMM gains control, an initial location of an APIC mapping may be stored in step 620. The initial location of the APIC mapping may be an address range to which an APIC is mapped (e.g., 450) prior to the SMI. Additionally, the initial location may be stored by the SMM code in a save state area of SMRAM. Alternatively, the initial location of the APIC mapping may be saved to registers (e.g., 116, 216, etc.) for later access and storage in a memory (e.g., 140).

As shown in FIG. 6, step 630 involves SMM code relocating an APIC mapping to a default location. The default location may be that used by a processor upon processor reset. Alternatively, a location with minimal or no overlap (e.g., 562, 564, 566, etc.) may serve as the default location, so long as the location is known by the SMM code. As such, the APIC may be moved during SMM (e.g., as described above with respect to FIG. 4) to reduce interference with accesses to SMRAM.

After relocating the APIC mapping to a default location, SMM tasks may be executed in step 640. Given that the APIC mapping was relocated in step 630, interference with execution of these SMM tasks may be reduced. As such, security for execution of SMM tasks is increased.

As shown in FIG. 6, step 650 involves returning the APIC mapping to its initial location (e.g., that stored in step 620). In one embodiment, the APIC mapping may be returned after the SMM task is completed to further limit the ability of the APIC to compromise SMM security. Thereafter, a resume (RSM) instruction may be executed in step 660, which may be followed by a return of control to the processor (e.g., 110, 210, etc.) and/or software running on the processor. As such, non-SMM operation may resume.

Figure 7:
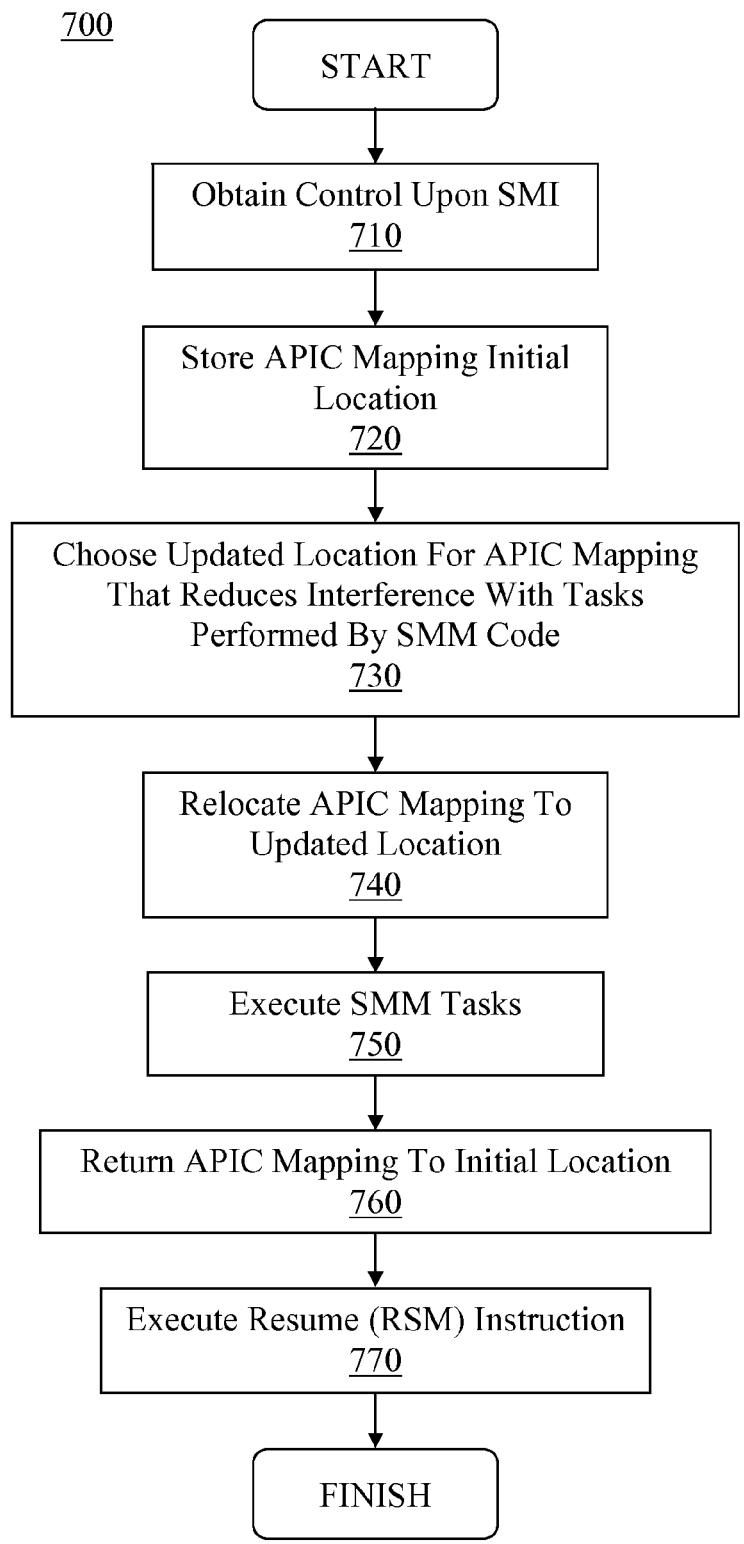
FIG. 7 shows a computer-implemented process for relocation of an APIC mapping to an updated location by SMM code to improve the security of processing in accordance with one embodiment of the present invention.

FIG. 7 shows computer-implemented process 700 for relocation of an APIC mapping to an updated location by SMM code to improve the security of processing in accordance with one embodiment of the present invention. As shown in FIG. 7, step 710 involves SMM code obtaining control upon SMI. Control may be transferred from the processor (e.g., 110, 210, etc.), and/or software code running thereon, to SMM code upon the execution of an SMI. Thereafter, SMM code may execute tasks, operations and/or other processes in the more-secure SMM environment.

After SMM gains control, an initial location of an APIC mapping may be stored in step 720. The initial location of the APIC mapping may be an address range to which an APIC is mapped (e.g., 450) prior to the SMI. Additionally, the initial location may be stored by the SMM code in a save state area of SMRAM. Alternatively, the initial location of the APIC mapping may be saved to registers (e.g., 116, 216, etc.) for later access and storage in a memory (e.g., 140).

As shown in FIG. 7, step 730 involves choosing an updated location for the APIC mapping that reduces interference with tasks performed by the SMM code. In one embodiment, the updated location for the APIC mapping may result in no overlap with SMRAM. For example, exemplary APIC mapping positions 562 and/or 564 of FIG. 5 may be chosen. Alternatively, the APIC mapping may be located such that it overlaps at least a portion of SMRAM (e.g., position 566) in another embodiment. As such, the overlapping of the APIC mapping with portions of SMRAM (e.g., determined by the updated location) may represent a reduction in interference with tasks performed by SMM code compared with that of alternative placements of the APIC mapping (e.g., position 568 of FIG. 5).

Step 740 involves SMM code relocating an APIC mapping to the updated location (e.g., that determined in step 730). As such, the APIC may be moved (e.g., to the updated location) during SMM (e.g., as described above with respect to FIG. 4) to reduce interference with accesses to SMRAM.

After relocating the APIC mapping to the updated location, SMM tasks may be executed in step 750. Given that the APIC mapping was relocated in step 740, interference with execution of these SMM tasks may be reduced. As such, security for execution of SMM tasks is increased.

As shown in FIG. 7, step 760 involves returning the APIC mapping to its initial location (e.g., that stored in step 720). In one embodiment, the APIC mapping may be returned after the SMM task is completed to further limit the ability of the APIC to compromise SMM security. Thereafter, a resume (RSM) instruction may be executed in step 770, which may be followed by a return of control to the processor (e.g., 110, 210, etc.) and/or software running on the processor. As such, non-SMM operation may resume.

Figure 8A:
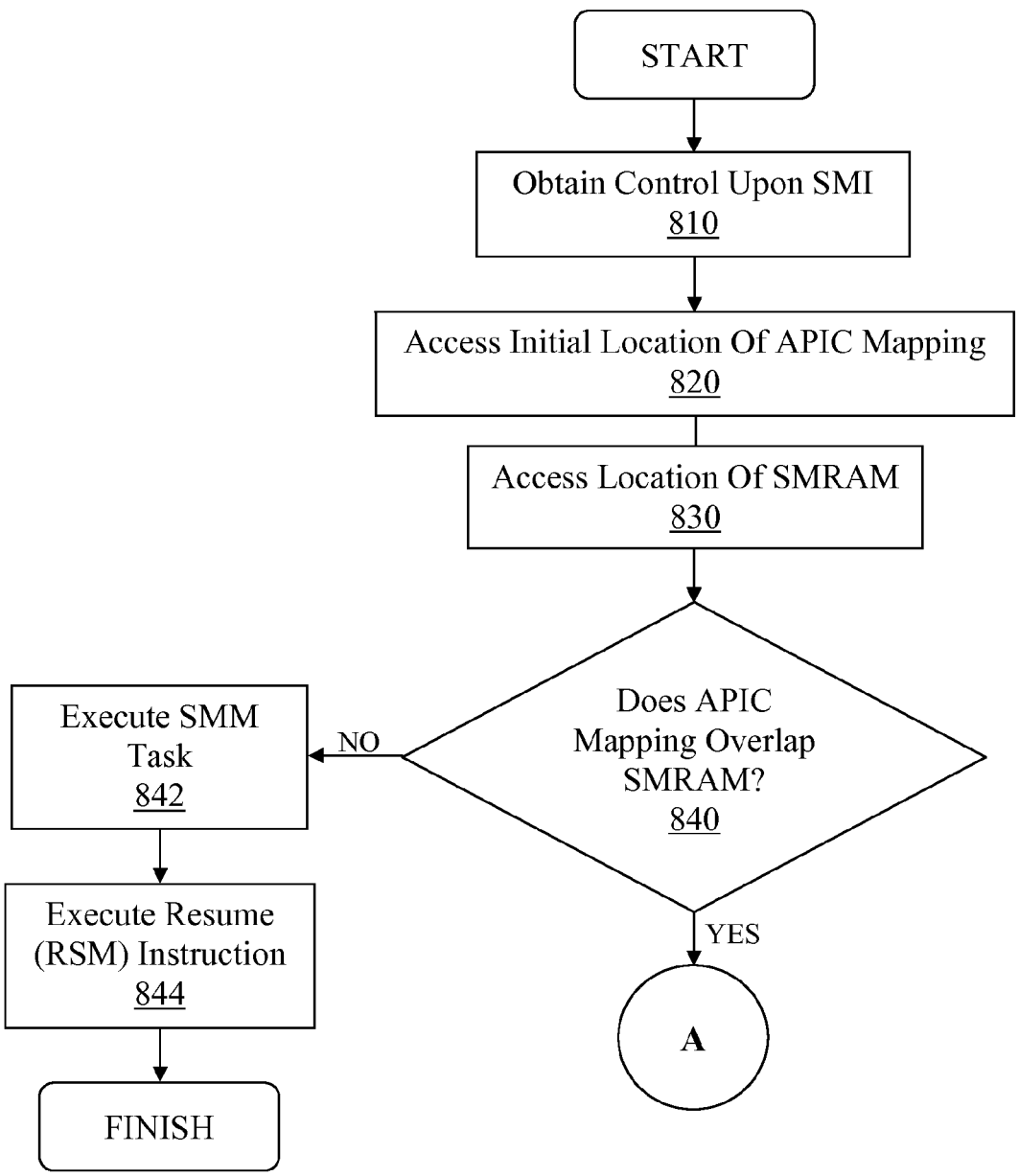
FIG. 8A shows a first portion of a computer-implemented process for relocation of an APIC mapping to a default location by SMM code if the APIC mapping overlaps SMRAM to improve the security of processing in accordance with one embodiment of the present invention.
Figure 8B:
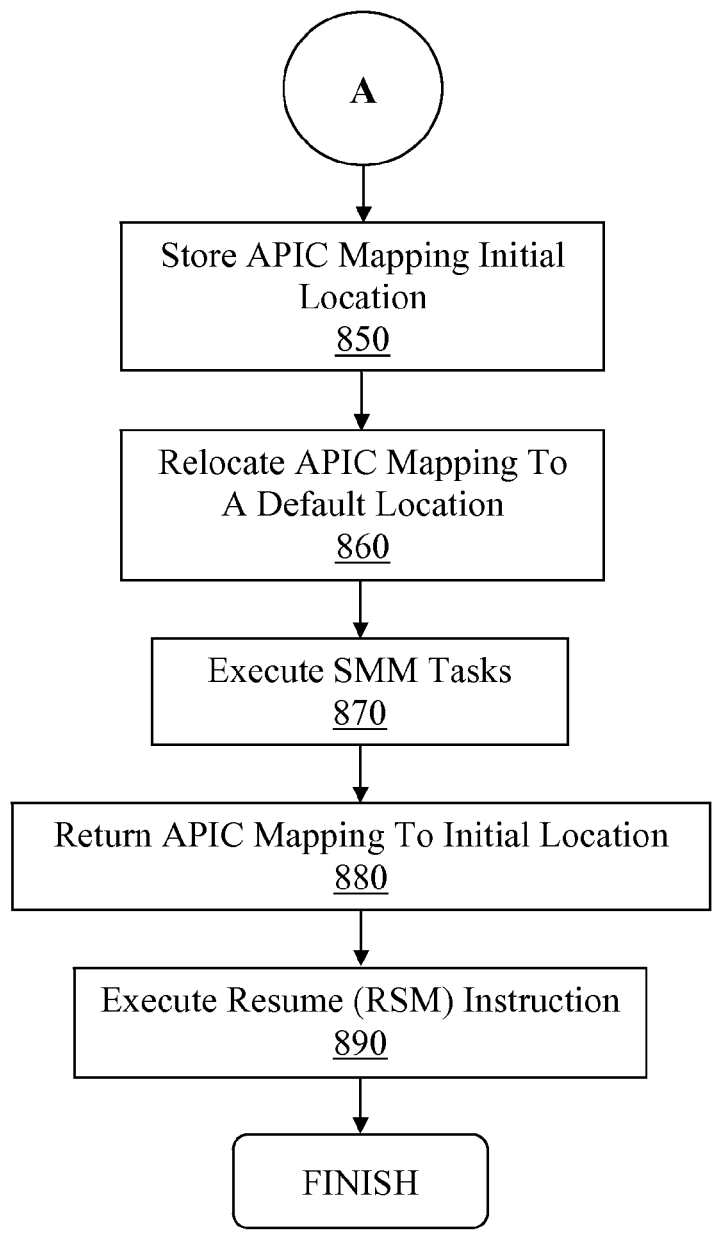
FIG. 8B shows a second portion of a computer-implemented process for relocation of an APIC mapping to a default location by SMM code if the APIC mapping overlaps SMRAM to improve the security of processing in accordance with one embodiment of the present invention.

FIGS. 8A and 8B show computer-implemented process 800 for relocation of an APIC mapping to a default location by SMM code if the APIC mapping overlaps SMRAM to improve the security of processing in accordance with one embodiment of the present invention. As shown in FIG. 8A, step 810 involves SMM code obtaining control upon SMI. Control may be transferred from the processor (e.g., 110, 210, etc.), and/or software code running thereon, to SMM code upon the execution of an SMI. Thereafter, SMM code may execute tasks, operations and/or other processes in the more-secure SMM environment.

Step 820 involves accessing an initial location of an APIC mapping. The initial location of the APIC mapping may be an address range to which an APIC is mapped (e.g., 450) prior to the SMI. Additionally, the initial location may be stored by the SMM code in a save state area of SMRAM. Alternatively, the initial location of the APIC mapping may be saved to registers (e.g., 116, 216, etc.) for later access and storage in a memory (e.g., 140).

As shown in FIG. 8A, step 830 involves accessing the current location of SMRAM. The current location may be determined by one or more accesses to a plurality of registers to determine or approximate an address range of SMRAM as described above with respect to FIG. 3. In one embodiment, processor registers (e.g., 116 and/or 216) may be accessed by SMM code to determine the current location of SMRAM. In another embodiment, northbridge registers may be accessed.

After determining an initial location of the APIC mapping and the current location of SMRAM, a determination is made in step 840 by SMM code as to whether the APIC mapping overlaps SMRAM. In one embodiment, if it is determined that the APIC mapping and SMRAM overlap, then SMM tasks may be executed in step 842. Thereafter, a resume (RSM) instruction may be executed in step 844, which may be followed by a return of control to the processor (e.g., 110, 210, etc.) and/or software running on the processor. As such, non-SMM operation may resume and process 800 may conclude.

Alternatively, if it is determined in step 840 by SMM code that the APIC mapping overlaps SMRAM, the initial location of the APIC mapping (e.g., as accessed in step 820) may be stored in step 850 analogously to step 620. After storing an initial location of an APIC mapping, the APIC mapping may be relocated by SMM code to a default location in step 860 analogously to step 630. As such, the APIC may be moved by SMM code (e.g., as described above with respect to FIG. 4) to reduce interference with accesses to SMRAM.

As shown in FIG. 8B, SMM tasks may be executed in step 870 before returning the APIC mapping to the initial location in step 880. In one embodiment, steps 870 and 880 may be performed analogously to steps 640 and 650, respectively, of FIG. 6. Thereafter, a resume (RSM) instruction may be executed in step 890, which may be followed by a return of control to the processor (e.g., 110, 210, etc.) and/or software running on the processor. As such, non-SMM operation may resume and process 800 may conclude.

Figure 9A:
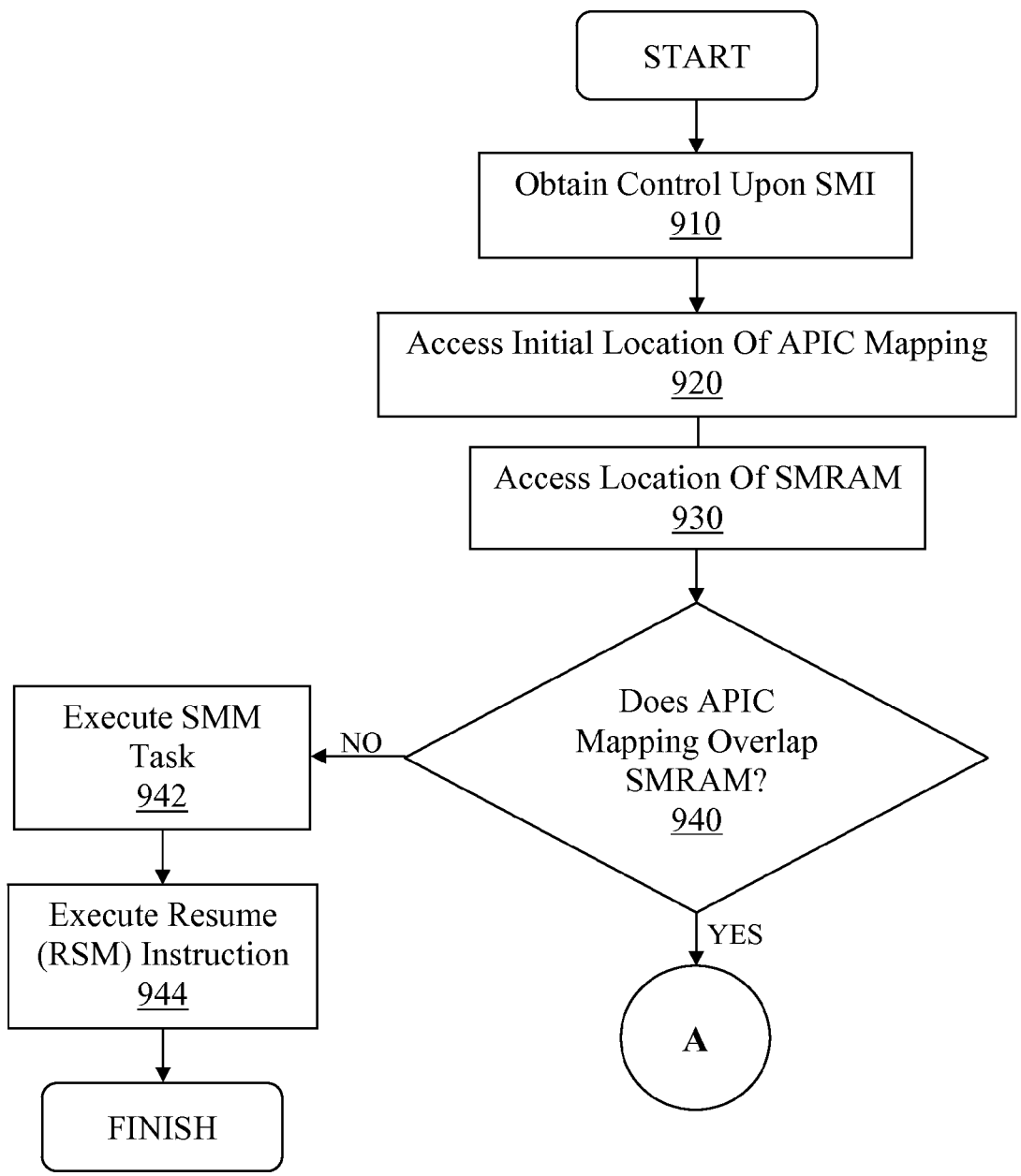
FIG. 9A shows a first portion of a computer-implemented process for relocation of an APIC mapping to an updated location by SMM code if the APIC mapping overlaps SMRAM to improve the security of processing in accordance with one embodiment of the present invention.
Figure 9B:
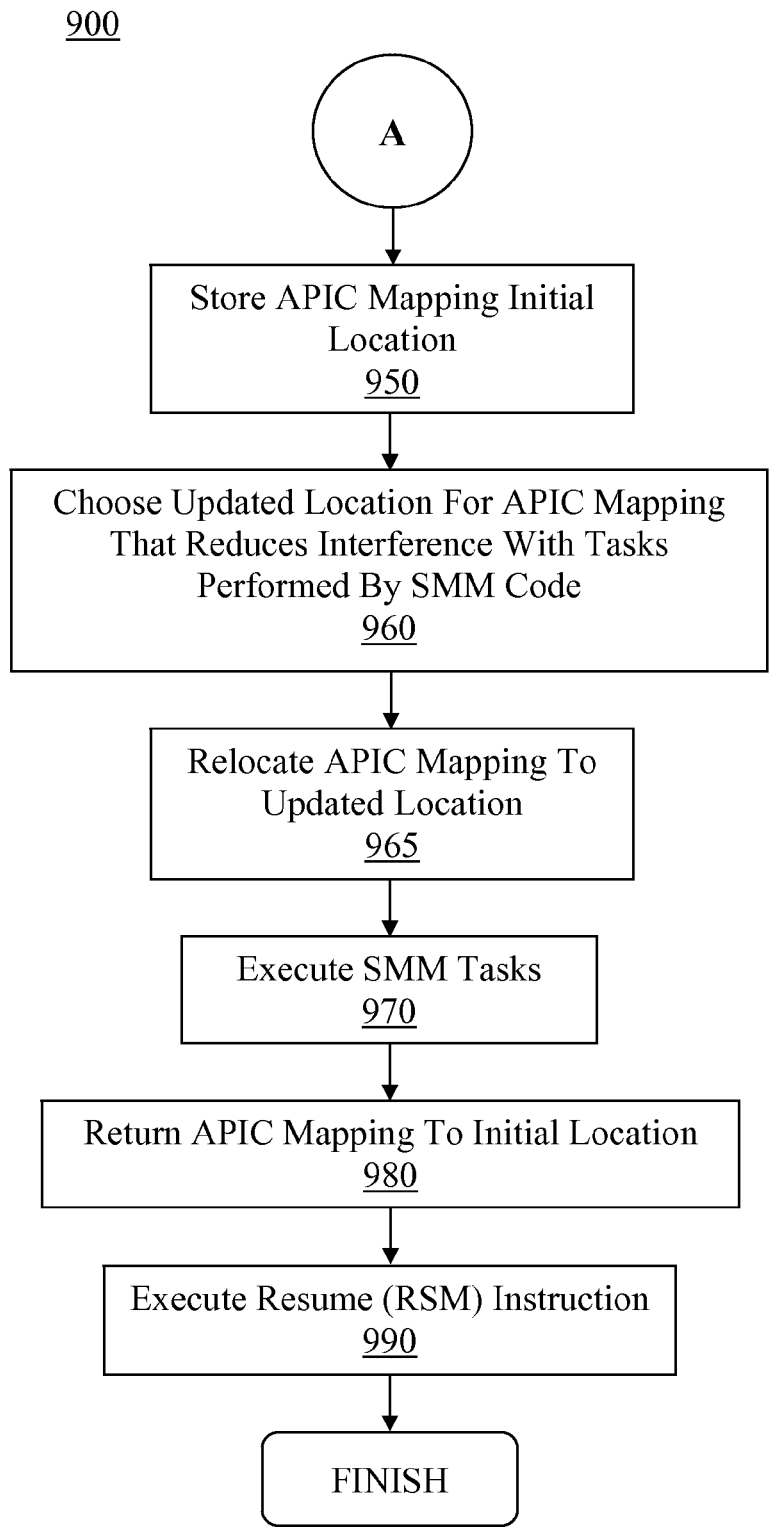
FIG. 9B shows a second portion of a computer-implemented process for relocation of an APIC mapping to an updated location by SMM code if the APIC mapping overlaps SMRAM to improve the security of processing in accordance with one embodiment of the present invention.

FIGS. 9A and 9B show computer-implemented process 900 for relocation of an APIC mapping to an updated location by SMM code if the APIC mapping overlaps SMRAM to improve the security of processing in accordance with one embodiment of the present invention. As shown in FIG. 9A, step 910 involves SMM code obtaining control upon SMI. Control may be transferred from the processor (e.g., 110, 210, etc.), and/or software code running thereon, to SMM code upon the execution of an SMI. Thereafter, SMM code may execute tasks, operations and/or other processes in the more-secure SMM environment.

Step 920 involves accessing an initial location of an APIC mapping. The initial location of the APIC mapping may be an address range to which an APIC is mapped (e.g., 450) prior to the SMI. Additionally, the initial location may be stored by the SMM code in a save state area of SMRAM. Alternatively, the initial location of the APIC mapping may be saved to registers (e.g., 116, 216, etc.) for later access and storage in a memory (e.g., 140).

As shown in FIG. 9A, step 930 involves accessing the current location of SMRAM. The current location may be determined by one or more accesses to a plurality of registers to determine or approximate an address range of SMRAM as described above with respect to FIG. 3. In one embodiment, processor registers (e.g., 116 and/or 216) may be accessed by SMM code to determine the current location of SMRAM. In another embodiment, northbridge registers may be accessed.

After determining an initial location of the APIC mapping and the current location of SMRAM, a determination is made in step 940 by SMM code as to whether the APIC mapping overlaps SMRAM. In one embodiment, if it is determined that the APIC mapping and SMRAM overlap, then SMM tasks may be executed in step 942. Thereafter, a resume (RSM) instruction may be executed in step 944, which may be followed by a return of control to the processor (e.g., 110, 210, etc.) and/or software running on the processor. As such, non-SMM operation may resume and process 900 may conclude.

Alternatively, if it is determined in step 940 by SMM code that the APIC mapping overlaps SMRAM, the initial location of the APIC mapping (e.g., as accessed in step 920) may be stored in step 950 analogously to step 720. An updated location may be chosen for the APIC mapping in step 960 (e.g., analogously to step 730), where interference with SMM tasks using the APIC may be reduced in the updated location. Thereafter, the APIC mapping may be relocated by SMM code to the updated location in step 965 analogously to step 740. As such, the APIC may be moved by SMM code (e.g., as described above with respect to FIG. 4) to reduce interference with accesses to SMRAM.

As shown in FIG. 9B, SMM tasks may be executed in step 970 before returning the APIC mapping to the initial location in step 980. In one embodiment, steps 970 and 980 may be performed analogously to steps 750 and 760, respectively, of FIG. 7. Thereafter, a resume (RSM) instruction may be executed in step 990, which may be followed by a return of control to the processor (e.g., 110, 210, etc.) and/or software running on the processor. As such, non-SMM operation may resume and process 900 may conclude.

SMM Code Disablement of APIC

Figure 10:
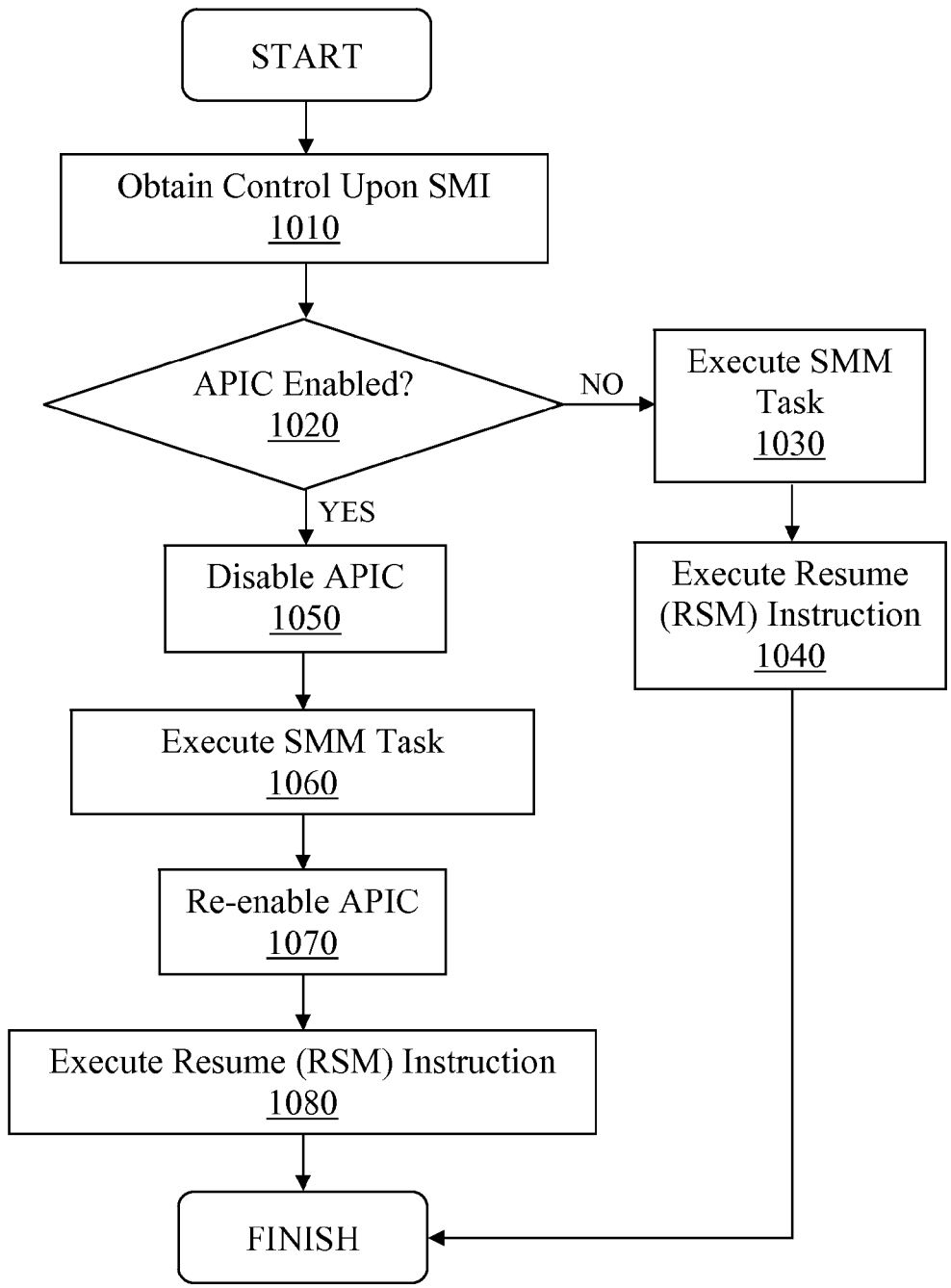
FIG. 10 shows a computer-implemented process for disabling an APIC with SMM code to improve the security of processing in accordance with one embodiment of the present invention.

FIG. 10 shows computer-implemented process 1000 for disabling an APIC with SMM code to improve the security of processing in accordance with one embodiment of the present invention. As shown in FIG. 10, step 1010 involves SMM code obtaining control upon SMI. Control may be transferred from the processor (e.g., 110, 210, etc.), and/or software code running thereon, to SMM code upon the execution of an SMI. Thereafter, SMM code may execute tasks, operations and/or other processes in the more-secure SMM environment.

Step 1020 involves making a determination as to whether the APIC is enabled. The enabled status of the APIC may be determined by SMM code through the access of data pertaining to the enabled status of the APIC (e.g., an enabled status flag, etc.), where the data may be stored in a processor register (e.g., 116, 216, etc.), northbridge register, memory (e.g., 140, 240, etc.), etc.

If the APIC is found to be disabled in step 1020, then SMM tasks may be executed in step 1030. It should be appreciated that the term "disabled" may refer to a condition where the APIC is rendered inoperable, or alternatively where the ability of the APIC to interfere with SMM tasks is reduced to a predetermined threshold. As such, SMM tasks may be executed in a more secure fashion. Thereafter, a resume (RSM) instruction may be executed in step 1040, which may be followed by a return of control to the processor (e.g., 110, 210, etc.) and/or software running on the processor. As such, non-SMM operation may resume and process 1000 may conclude.

Alternatively, if the APIC is found to be enabled in step 1020, the APIC may then be disabled in step 1050. The APIC may be disabled by SMM code toggling a global enable/disable flag, where the flag may be stored within a register of the processor (e.g., 116 and/or 216) or the northbridge. Alternatively, SMM code toggling the state of a software enable/disable flag may be used to disable the APIC, where the flag may be stored within a register of the processor (e.g., 116 and/or 216) or the northbridge. And in another embodiment, other means may be used to disable the APIC. As such, once the APIC is disabled, SMM tasks may be executed in step 1060 with reduced interference from the APIC mapping.

After completion of SMM tasks, the APIC may be re-enabled in step 1070. Thereafter, a resume (RSM) instruction may be executed in step 1080, which may be followed by a return of control to the processor (e.g., 110, 210, etc.) and/or software running on the processor. As such, non-SMM operation may resume and process 1000 may conclude.

SMM Code Halting of Processor Execution

Figure 11:
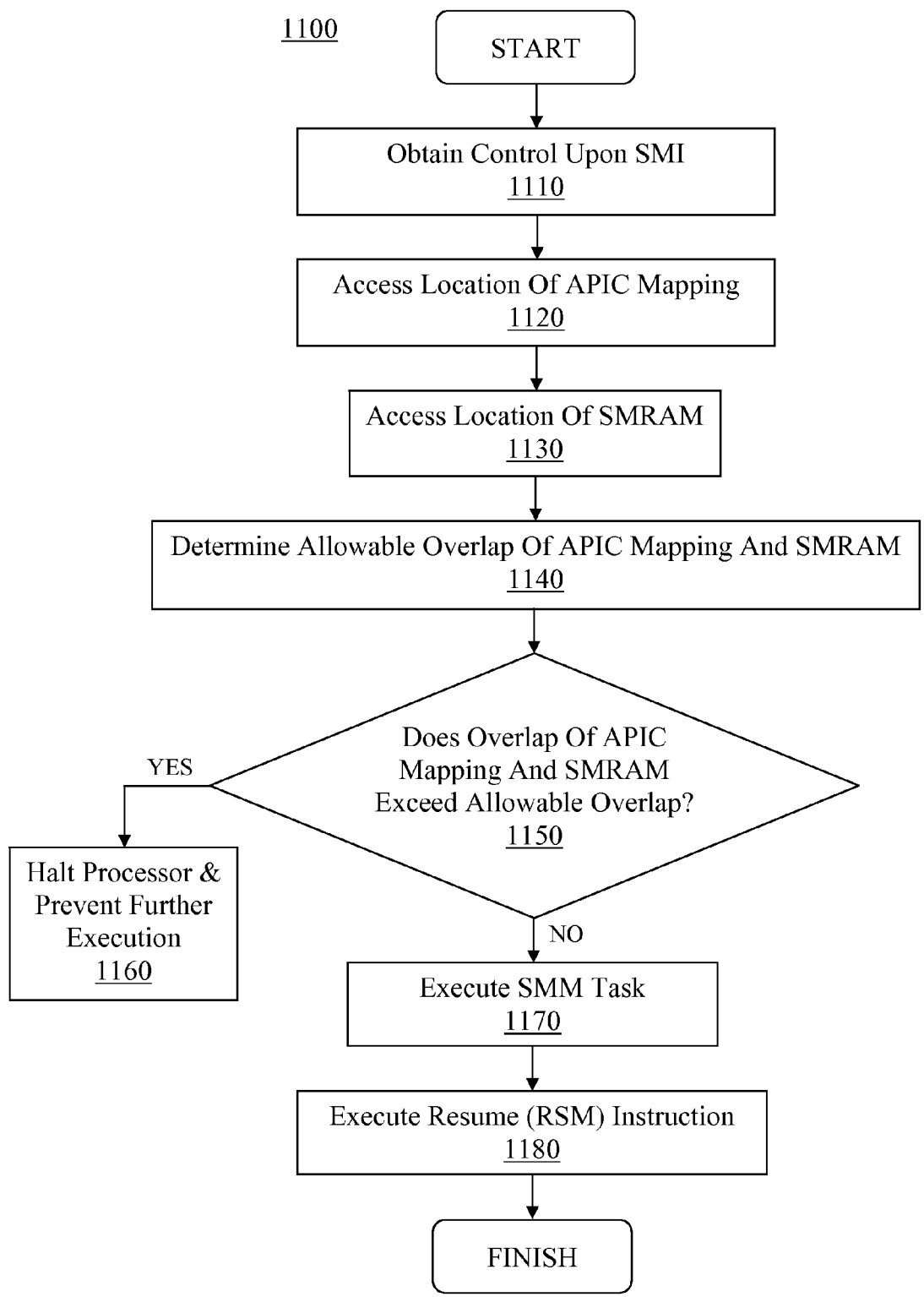
FIG. 11 shows a computer-implemented process for halting a processor with SMM code based on the location of an APIC mapping with respect to the location of SMRAM to improve the security of processing in accordance with one embodiment of the present invention.

FIG. 11 shows computer-implemented process 1100 for halting a processor with SMM code based on the location of an APIC mapping with respect to the location of SMRAM to improve the security of processing in accordance with one embodiment of the present invention. As shown in FIG. 11, step 1110 involves SMM code obtaining control upon SMI. Control may be transferred from the processor (e.g., 110, 210, etc.), and/or software code running thereon, to SMM code upon the execution of an SMI. Thereafter, SMM code may execute tasks, operations and/or other processes in the more-secure SMM environment.

Step 1120 involves accessing an initial location of an APIC mapping. The initial location of the APIC mapping may be an address range to which an APIC is mapped (e.g., 450) prior to the SMI. Additionally, the initial location may be stored by the SMM code in a save state area of SMRAM. Alternatively, the initial location of the APIC mapping may be saved to registers (e.g., 116, 216, etc.) for later access and storage in a memory (e.g., 140).

As shown in FIG. 11, step 1130 involves accessing the current location of SMRAM. The current location may be determined by one or more accesses to a plurality of registers to determine or approximate an address range of SMRAM as described above with respect to FIG. 3. In one embodiment, processor registers (e.g., 116 and/or 216) may be accessed by SMM code to determine the current location of SMRAM. In another embodiment, northbridge registers may be accessed.

Step 1140 involves SMM code determining an allowable overlap of an APIC mapping and SMRAM. The allowable overlap may be determined by an amount of overlap relating to an acceptable amount of interference by the APIC with accesses to SMRAM. As such, the allowable overlap may not exceed an amount of overlap such that the interference is unacceptable, where the acceptability threshold may be predetermined or determined by the SMM code on the fly. Alternatively, where minimal or no interference is desired, the allowable overlap may be determined to be minimal or nonexistent.

In step 1150, a determination is made by SMM code as to whether the overlap of the APIC mapping and SMRAM exceed the allowable overlap (e.g., determined in step 1140). If it is determined that the actual overlap exceeds the allowable overlap, then the processor may be halted in step 1160, thereby preventing further execution by the processor. In one embodiment, a halt (HLT) instruction may be executed upon determining an excessive overlap. Alternatively, other means may be used to prevent the processor from resuming execution (e.g., an infinite loop, etc.). As such, SMM code may reduce APIC interference with accesses to SMRAM by halting the computer system upon determining an overlap of the APIC mapping and SMRAM. Moreover, embodiments narrow the window of vulnerability open to malicious attackers by reducing the number of writes to memory necessary to perform process 1100.

Alternatively, if it is determined in step 1150 that the actual overlap does not exceed the allowable overlap determined in step 1140, then SMM tasks may be executed in step 1170. Thereafter, a resume (RSM) instruction may be executed in step 1180, which may be followed by a return of control to the processor (e.g., 110, 210, etc.) and/or software running on the processor. As such, non-SMM operation may resume and process 1100 may conclude.

Figure 12:
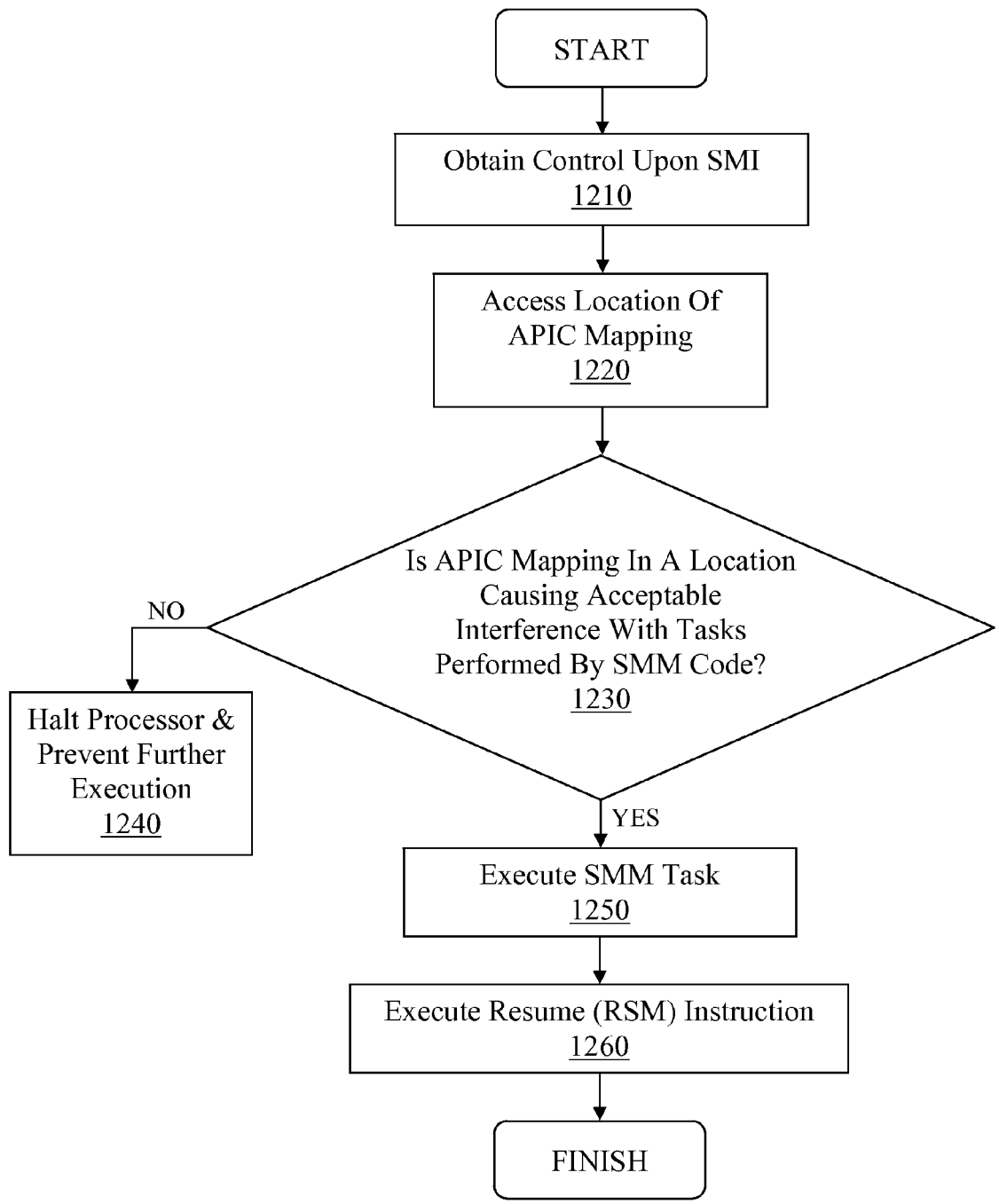
FIG. 12 shows a computer-implemented process for halting a processor with SMM code based on the location of an APIC mapping with respect to a location causing an acceptable level of interference with tasks performed by SMM code to improve the security of processing in accordance with one embodiment of the present invention.

FIG. 12 shows computer-implemented process 1200 for halting a processor with SMM code based on the location of an APIC mapping with respect to a location causing an acceptable level of interference with tasks performed by SMM code to improve the security of processing in accordance with one embodiment of the present invention. As shown in FIG. 12, step 1210 involves SMM code obtaining control upon SMI. Control may be transferred from the processor (e.g., 110, 210, etc.), and/or software code running thereon, to SMM code upon the execution of an SMI. Thereafter, SMM code may execute tasks, operations and/or other processes in the more-secure SMM environment.

Step 1220 involves accessing an initial location of an APIC mapping. The initial location of the APIC mapping may be an address range to which an APIC is mapped (e.g., 450) prior to the SMI. Additionally, the initial location may be stored by the SMM code in a save state area of SMRAM. Alternatively, the initial location of the APIC mapping may be saved to registers (e.g., 116, 216, etc.) for later access and storage in a memory (e.g., 140).

As shown in FIG. 12, step 1230 involves SMM code making a determination as to whether the APIC mapping is in a location causing an acceptable amount of interference with SMM tasks. In one embodiment, the APIC may be allowed to overlap at least a portion of SMRAM. In other embodiments, the disallowed APIC locations may not overlap SMRAM, but may otherwise interfere with execution of SMM tasks. And in other embodiments, it may be determined that interference from the APIC is acceptable if the current location is one of a number of allowable or "safe" locations (e.g., a default location, etc.). As such, if it is determined that the level of interference of the APIC mapping with execution of SMM tasks is unacceptable, then the processor may be halted in step 1240, thereby preventing further execution by the processor. In one embodiment, a halt (HLT) instruction may be executed upon determining an excessive overlap. Alternatively, other means may be used to prevent the processor from resuming execution (e.g., an infinite loop, etc.). As such, SMM code may reduce APIC interference with accesses to SMRAM by halting the computer system upon determining an overlap of the APIC mapping and SMRAM. Moreover, embodiments narrow the window of vulnerability open to malicious attackers by reducing the number of writes to memory necessary to perform process 1200.

Alternatively, if the level of interference of the APIC mapping with the execution of SMM tasks is determined to be acceptable (e.g., at or below an acceptable interference threshold), then SMM tasks may be executed in step 1250. Thereafter, a resume (RSM) instruction may be executed in step 1260, which may be followed by a return of control to the processor (e.g., 110, 210, etc.) and/or software running on the processor. As such, non-SMM operation may resume and process 1200 may conclude.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method comprising:
   in response to a system management interrupt, storing a first memory location associated with a mapping of an advanced programmable interrupt controller prior to said system management interrupt;
   moving said mapping of said advanced programmable interrupt controller to a second memory location; and
   executing at least one system management mode task while said advanced programmable interrupt controller is mapped to said second memory location.

2. The method of claim 1 further comprising:
   returning said mapping of said advanced programmable interrupt controller to said first memory location; and
   executing a resume instruction.

3. The method of claim 1, wherein said second memory location is a default memory location for said advanced programmable interrupt controller, and wherein said second memory location is associated with a reset of a processor of a computer system.

4. The method of claim 1, wherein said second memory location is operable to reduce interference of said mapping of said advanced programmable interrupt controller with said at least one system management mode task.

5. The method of claim 1, wherein said second memory location is operable to cause an overlap of said mapping of said advanced programmable interrupt controller with a portion of system management random access memory in a memory, and wherein said overlap is selected from a group consisting of a first overlap less than a predetermined overlap and a second overlap equal to said predetermined overlap.

6. The method of claim 1 further comprising:
   identifying a location of a portion of system management random access memory in a memory;
   determining whether said mapping of said advanced programmable interrupt controller overlaps a portion of said system management random access memory; and
   if an overlap is determined, moving said mapping of said advanced programmable interrupt controller to a default memory location for said advanced programmable interrupt controller used if a processor of a computer system is reset.

7. The method of claim 1 further comprising:
   identifying a location of a portion of system management random access memory in a memory;
   determining whether said mapping of said advanced programmable interrupt controller overlaps a portion of said system management random access memory in a memory; and
   if an overlap is determined, moving said mapping of said advanced programmable interrupt controller to a third memory location, wherein said third memory location is operable to reduce interference between said mapping of said advanced programmable interrupt controller and said at least one system management mode task.

8. The method of claim 1, wherein said first memory location is associated with a register of a processor of a computer system.

9. The method of claim 1, wherein said first memory location is associated with a portion of a save-state map of a memory.

10. A method comprising:
    in response to a system management interrupt, disabling an advanced programmable interrupt controller associated with a processor; and
    executing at least one system management mode task while said advanced programmable interrupt controller is disabled.

11. The method of claim 10 further comprising:
    determining whether said advanced programmable interrupt controller is enabled prior to said disabling of said advanced programmable interrupt controller; and
    if said advanced programmable interrupt controller is enabled, re-enabling said advanced programmable interrupt controller before execution of a resume instruction.

12. The method of claim 10 further comprising:
    determining whether said advanced programmable interrupt controller is enabled prior to said disabling of said advanced programmable interrupt controller; and
    if said advanced programmable interrupt controller is not enabled, bypassing said disabling of said advanced programmable interrupt controller and executing a resume instruction after said executing at least one system management mode task.

13. The method of claim 10, wherein said disabling and said enabling are performed by changing a state of a global flag within a model specific register of said processor.

14. The method of claim 10, wherein said disabling and said enabling are performed by changing a state of a software flag within a register associated with said advanced programmable interrupt controller.

15. A method comprising:
    identifying a first location in a memory, wherein said first location comprises an address to which a portion of an advanced programmable interrupt controller is mapped;
    identifying a second location in said memory, wherein said second location comprises a portion of system management random access memory;
    determining a first overlap of a first address range associated with said first location and a second address range associated with said second location;
    determining a second overlap of said first address range and said second address range; and
    if said second overlap is greater than said first overlap, halting a processor from executing an operating system.

16. The method of claim 15, wherein said halting said processor from executing said operating system comprises executing a halt instruction.

17. The method of claim 15, wherein said halting said processor from executing said operating system comprises executing an infinite loop.

18. The method of claim 15, wherein said first location is a base address of said mapping of said portion of said advanced programmable interrupt controller.

19. The method of claim 15, wherein said second location is a base address of said system management random access memory.

20. A method comprising:
    identifying a location in a memory, wherein said location comprises an address associated with a mapping of an advanced programmable interrupt controller;
    determining if interference by said advanced programmable interrupt controller with at least one system management mode task is acceptable; and
    if said interference is not acceptable, halting a processor from executing an operating system.

21. The method of claim 20, wherein said halting said processor from executing said operating system comprises executing a halt instruction.

22. The method of claim 20, wherein said halting said processor from executing said operating system comprises executing an infinite loop.

23. The method of claim 20, wherein said location is a base address of said mapping of said portion of said advanced programmable interrupt controller.

* * * * *